United States Patent
Kneuper et al.

(10) Patent No.: US 10,156,469 B2
(45) Date of Patent: Dec. 18, 2018

(54) SYSTEMS AND METHODS FOR AIRCRAFT MASS DETERMINATION

(71) Applicant: The Boeing Company, Chicago, IL (US)

(72) Inventors: Nils Kneuper, Bergkamen (DE); Ralf Rene Cabos, Bergkamen (DE)

(73) Assignee: The Boeing Company, Chicago, IL (US)

( * ) Notice: Subject to any disclaimer, the term of this patent is extended or adjusted under 35 U.S.C. 154(b) by 22 days.

(21) Appl. No.: 15/441,436

(22) Filed: Feb. 24, 2017

(65) Prior Publication Data

US 2018/0245965 A1 Aug. 30, 2018

(51) Int. Cl.
| | |
|---|---|
| *G01G 19/02* | (2006.01) |
| *B64D 45/00* | (2006.01) |
| *G01G 19/07* | (2006.01) |
| *G01G 19/08* | (2006.01) |
| *B64F 1/22* | (2006.01) |

(52) U.S. Cl.
CPC .......... *G01G 19/024* (2013.01); *B64D 45/00* (2013.01); *B64F 1/225* (2013.01); *G01G 19/07* (2013.01); *G01G 19/086* (2013.01)

(58) Field of Classification Search
CPC ........ G01G 19/024; G01G 9/00; G01G 19/07; G01G 19/086; B64D 45/00; B46C 25/50; B46C 25/40; B60B 39/00; B60P 3/125; B62D 49/02; B64F 1/22; B64F 1/227; Y02T 50/8265

USPC .......... 702/141, 144, 173, 174, 175; 244/50; 73/865

See application file for complete search history.

(56) References Cited

U.S. PATENT DOCUMENTS

| | | | | |
|---|---|---|---|---|
| 4,225,279 A | * | 9/1980 | Boyer | B60P 3/125 |
| | | | | 414/428 |
| 2008/0312870 A1 | * | 12/2008 | Cox | B64C 25/405 |
| | | | | 702/173 |
| 2010/0140392 A1 | * | 6/2010 | Perry | B64C 25/50 |
| | | | | 244/50 |
| 2016/0200428 A1 | * | 7/2016 | Morris | B60T 8/1703 |
| | | | | 244/50 |

* cited by examiner

*Primary Examiner* — John H Le
(74) *Attorney, Agent, or Firm* — McDonnell Boehnen Hulbert & Berghoff LLP

(57) ABSTRACT

An example methods for aircraft mass determination at pushback includes determining an acceleration of a pushback vehicle while moving an aircraft, determining a pushback force applied by the pushback vehicle while moving the aircraft, and determining a total mass of the aircraft based on the pushback force, the acceleration of the pushback vehicle during pushback, and a coefficient of static friction between tires of the aircraft and a surface on which the aircraft moves. An example system includes a pushback vehicle coupled to an acceleration sensor and a force sensor, and a computing device having one or more processors to determine a total mass of the aircraft based on the pushback force, the acceleration of the pushback vehicle during pushback, and a coefficient of static friction between tires of the aircraft and a surface on which the aircraft moves.

20 Claims, 8 Drawing Sheets

SYSTEMS AND METHODS FOR AIRCRAFT MASS DETERMINATION

FIELD

The present disclosure relates generally to systems and methods for determining a total mass of an aircraft while moving the aircraft, and more particularly to, example methods for determining an acceleration of a pushback vehicle and a pushback force applied by the pushback vehicle useful for determination of the total mass of the aircraft fully loaded.

BACKGROUND

Developing optimal aircraft trajectories that minimize flight times, fuel burn, and associated environmental emissions can enhance air traffic flow and also help the aviation industry cope with increasing fuel costs. Optimal cruise altitudes are based on, among others, atmospheric constants and aerodynamic drag coefficients that are aircraft type dependent and vary per aircraft type, while a total lift and drag generated (units of force) depends on aircraft mass. Aircraft mass determinations can be difficult to determine.

A mass of an aircraft includes many variables, such as an empty weight of the aircraft itself, an operating weight including weight of all catering and passenger service packs and crew equipment, a weight of fuel on board, a weight of all cargo/luggage, as well as a weight of all passengers.

Current flight planning systems, as well as other aircraft systems needing a value for a total mass of an aircraft, generally use a weight estimate for each passenger and associated hand-carry luggage. However, an accuracy of these passenger weight assumptions is unknown because airlines do not weigh each passenger and hand-carry luggage separately. Additionally, real weight values may vary significantly depending on passengers from different world regions, or luggage restrictions for different airlines, further adding uncertainty to these standard weight assumptions.

An accurate total mass of an aircraft is an important value useful for trajectory planning systems in order to plan an optimal flight route, as a most-optimal trajectory depends heavily on aircraft mass. Thus, what is needed is a method to accurately determine a mass value for a fully-loaded aircraft.

SUMMARY

In one example, a method is described comprising determining an acceleration of a pushback vehicle while moving an aircraft, determining a pushback force applied by the pushback vehicle while moving the aircraft, and determining a total mass of the aircraft based on the pushback force, the acceleration of the pushback vehicle during pushback, and a coefficient of static friction between tires of the aircraft and a surface on which the aircraft moves.

In another example, a method is described comprising determining a first acceleration of a pushback vehicle while moving an aircraft, and determining a first pushback force applied by the pushback vehicle while moving the aircraft. The method also comprises applying a known mass to the aircraft, determining a second acceleration of the pushback vehicle while moving the aircraft with the known mass, determining a second pushback force applied by the pushback vehicle while moving the aircraft with the known mass, and determining a coefficient of static friction between tires of the aircraft and a surface on which the aircraft moves based on the known mass, the first acceleration, the first pushback force, the second acceleration, and the second pushback force.

In another example, a system is described comprising a pushback vehicle coupled to an acceleration sensor to determine an acceleration of the pushback vehicle while moving an aircraft, and coupled to a force sensor to determine a pushback force applied by the pushback vehicle while moving the aircraft. The system also comprises a computing device having one or more processors to determine a total mass of the aircraft based on the pushback force, the acceleration of the pushback vehicle during pushback, and a coefficient of static friction between tires of the aircraft and a surface on which the aircraft moves.

The features, functions, and advantages that have been discussed can be achieved independently in various examples or may be combined in yet other examples further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Example systems and methods describe a process of how a total mass of an aircraft can be determined at pushback of the aircraft from the terminal, or while moving the aircraft in any scenario (e.g., moving the aircraft to or from a de-icing area). Sensors on a pushback vehicle can measure a number of variables useful for calculation in an equation of motion to arrive at the total mass of the aircraft. Instead of weighing all cargo and passengers/crew separately, which is not practical, the total mass of the aircraft can be calculated directly once fully loaded. In this way, a more accurate value for the total mass can be produced. A more accurate mass value, in turn, allows any trajectory planning system to plan a more optimal route that is more fuel efficient, as a most cost-optimal trajectory depends on aircraft mass. In addition, the calculated mass can be used to validate or note discrepancies with estimated weight used to calculate fuel burn, and provide a warning when a difference is beyond an error margin, for example.

Figure 1:
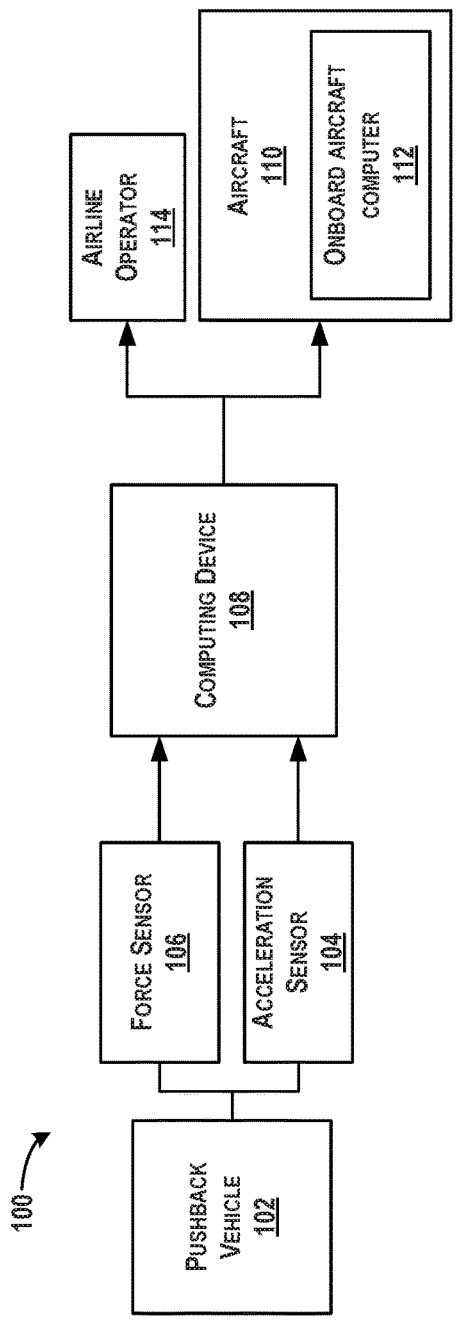
FIG. 1 is a block diagram illustrating a system, according to an example implementation.

Referring now to the Figures, FIG. 1 is a block diagram illustrating a system 100, according to an example implementation. The system 100 includes a pushback vehicle 102 coupled to an acceleration sensor 104 and a force sensor 106. The system 100 also includes a computing device 108 having one or more processors to determine a total mass of an aircraft 110 at pushback of the aircraft 110 from a terminal.

The pushback vehicle 102 can take many forms, and may include an airplane tug or other type of vehicle that may pull or push the aircraft 110. The acceleration sensor 104, the force sensor 106, and the computing device 108 may be positioned on the pushback vehicle 102, in some examples. Additional configurations are described below.

The acceleration sensor 104 determines an acceleration of the pushback vehicle 102 during pushback of the aircraft 110.

The force sensor 106 determines a pushback force applied by the pushback vehicle 102 during pushback of the aircraft 110. In one example, the force sensor 106 includes a strain gauge. In another example, the force sensor 106 includes a pressure sensor as well.

The computing device 108 is described more fully below with reference to FIG. 16. The computing device 108 is communicatively coupled to the acceleration sensor 104 and the force sensor 106. In one example, the computing device 108 is directed wired to the acceleration sensor 104 and the force sensor 106. In another example, the computing device 108 is wirelessly connected to the acceleration sensor 104 and the force sensor 106.

In examples, the computing device 108 has one or more processors to determine a total mass of the aircraft 110 at pushback based on the pushback force received from the force sensor 106, the acceleration of the pushback vehicle 102 during pushback or while moving the aircraft received from the acceleration sensor 104, and a coefficient of static friction between tires of the aircraft 110 and a surface on which the aircraft 110 moves. The computing device 108 may output the total mass of the aircraft 110 to an onboard aircraft computer 112, and/or to an airline operator 114. The onboard aircraft computer 112 and/or the airline operator 114 may use the total mass of the aircraft 110 to determine an optimal trajectory or to determine modifications to an assigned trajectory for more optimal fuel usage, for example.

Figure 2:
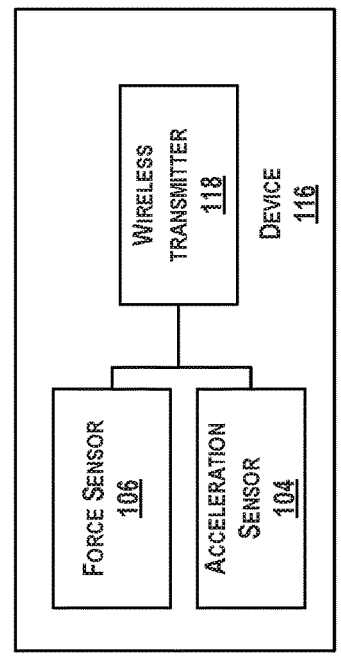
FIG. 2 is a block diagram illustrating a device housing both the acceleration sensor and the force sensor, according to an example implementation.

FIG. 2 is a block diagram illustrating a device 116 housing both the acceleration sensor 104 and the force sensor 106, according to an example implementation. The device 116 further includes a wireless transmitter 118 to transmit data including the acceleration of the pushback vehicle 102 during pushback of the aircraft 110 and the pushback force applied by the pushback vehicle 102 during pushback of the aircraft 110 to the computing device 108, for example. In one example, the device 116 may be positioned on the pushback vehicle 102. Additional configurations are described below.

Figure 3:
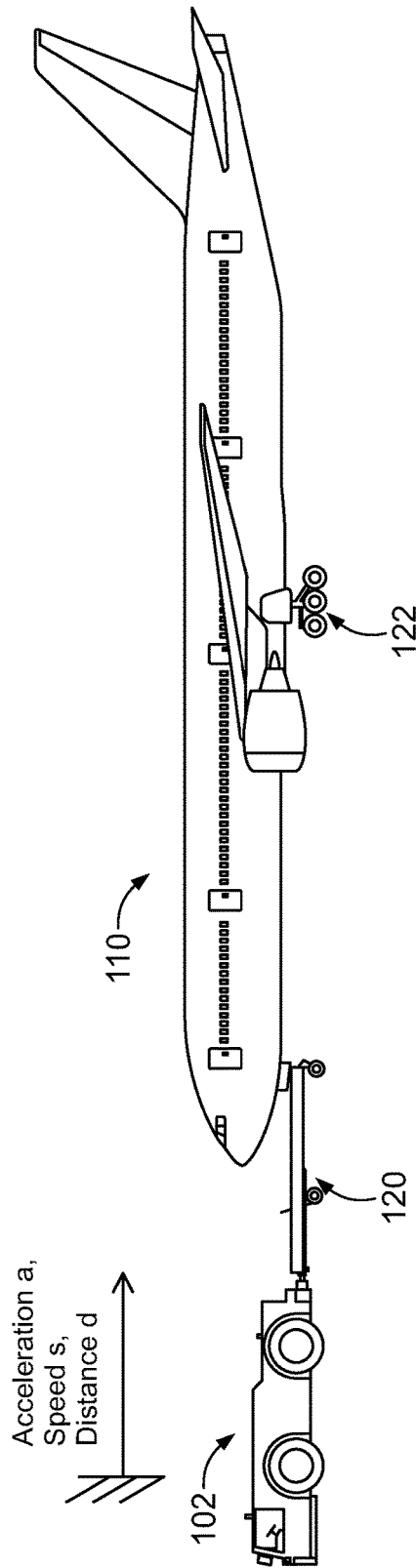
FIG. 3 is a conceptual illustration of the pushback vehicle and the aircraft at pushback from the terminal, according to an example implementation.

FIG. 3 is a conceptual illustration of the pushback vehicle 102 and the aircraft 110 at pushback from the terminal, according to an example implementation. The illustration in FIG. 3 is conceptual and shows how to determine the total mass of the aircraft 110 at pushback by calculating the total mass of the aircraft 110 fully loaded and ready for take-off. At pushback, both the pushback vehicle 102 and the aircraft 110 move backward away from the terminal (e.g., in a rightward direction as shown in FIG. 3). The pushback vehicle 102 is connected to the aircraft 110 through a rod 120, and thus, movement of the pushback vehicle 102 and the aircraft 110 is at equal speeds. Both of the pushback vehicle 102 and the aircraft 110 will also have the same acceleration (a), speed (s), and cover the same distance (d).

Figure 4:
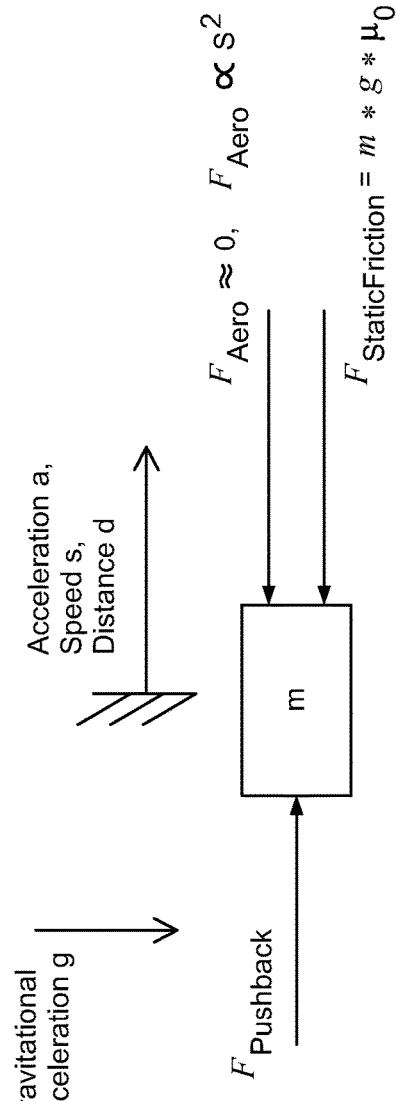
FIG. 4 is a conceptual diagram of movement of the aircraft from a perspective of the aircraft, according to an example implementation.

FIG. 4 is a conceptual diagram of movement of the aircraft 110 from a perspective of the aircraft 110, according to an example implementation. FIG. 4 illustrates a free-body diagram, where an unknown mass (m) of the aircraft 110 that is accelerated with acceleration (a) has three forces acting on it at any time during pushback that include $F_{Pushback}$, $F_{Aero}$, and $F_{StaticFriction}$.

The $F_{Pushback}$ force is the pushing force of the pushback vehicle 102. For example, $F_{Pushback}$ is the force the pushback vehicle 102 generates to move the aircraft 110, and this variable is unknown and will be measured with the force sensor 106.

The $F_{Aero}$ force includes aerodynamic forces acting as drag on the aircraft 110 due to the movement. For example, $F_{Aero}$ is a force of drag generated due to speed of the aircraft 110 and subsequently generated drag between air and aircraft surface. However, as $F_{Aero}$ is proportional to a squared speed ($s^2$), and the pushback speed necessarily being very low (e.g., a constant acceleration on the order of about 0.1 to 0.5 m/s), this force is negligible and can be set to zero (e.g., $s^2=(0.5\ m/s)^2=0.25\ (m/s)^2$ and speed values of less than 1 m/s further amplify this negligibility). Furthermore, even in bad weather conditions with high winds, $F_{Aero}$ would be negligible because airplanes are designed to be aerodynamically efficient. Alternatively, $F_{Aero}$ would be negligible as compared to the force of static friction, and thus, $F_{Aero}$ can be ignored. The larger the aircraft, the more negligible $F_{Aero}$ is due to the force of static friction being larger.

The $F_{StaticFriction}$ force is the force due to static friction between tires 122 of the aircraft 110 and a surface on which the aircraft 110 moves (e.g., the concrete floor). For example, $F_{StaticFriction}$ is a sum of forces acting on the tires 122 of the aircraft 110, which act against a direction of motion. Static friction is dependent on the mass multiplied by gravitational acceleration and a constant, $\mu_0$. The constant $\mu_0$ is called the static friction coefficient and depends on a corresponding surfaces' geometry and any potential lubricating liquid (e.g., rain or water) or lubricating solid (e.g., ice crystals or snow) between the surface and the tires 122. The static friction coefficient can be found within standard literature or is a constant known to a manufacturer of the tires 122, and therefore also known to the aircraft manufacturer. The static friction coefficient may be dependent on a material of the tire, and/or dependent on the surface on which the tire moves as well.

From the free-body diagram shown in FIG. 4, an equation of motion can be deduced from Newton's 2nd law of motion in which any object with a mass m (e.g., the aircraft 110), being accelerated with acceleration a, is equal to a sum of forces acting on the object. In this example, the F_Pushback acts in a direction opposite F_Aero and F_StaticFriction. With F_Aero being proportional to the squared speed $s^2$ and the system moving with a low speed (e.g., <1 m/s) during pushback, F_Aero is close to 0 and therefore negligible. The equation of motion is solved for the unknown mass m, as shown below.

$$m \times a = F_{Pushback} - F_{Aero} - F_{StaticFriction}$$

$$m \times a = F_{Pushback} - m \times g \times \mu_0$$

$$m = \frac{F_{Pushback}}{a + g \times \mu_0}$$

In the equation above, m is the total mass of the aircraft 110, $F_{Pushback}$ is the pushback force, a is the acceleration of the pushback vehicle 102 during pushback, g is acceleration due to gravity, and $\mu_0$ is the coefficient of static friction between the tires of the aircraft 110 and the surface on which the aircraft moves.

At this point, to calculate the mass m, only the pushback force and acceleration during pushback are needed. The static friction coefficient is known from the tire manufacturer for different weather conditions. In some examples, the coefficient of static friction between tires of the aircraft 110 and the surface on which the aircraft 110 moves is further based on a weather condition. For wet surfaces, the coefficient of static friction will differ as compared to dry surfaces. The two unknown values of the pushback force and acceleration during pushback can be measured using sensors on the pushback vehicle 102.

In the example shown in FIG. 3, the pushback vehicle 102 operates to pushback the aircraft 110 from a terminal prior to take-off, and the total mass of the aircraft can be determined at that time. However, in other examples, the pushback vehicle 102 may move the aircraft 110 in many other scenarios and determine the total mass of the aircraft 110 while moving the aircraft 110. As one example, the pushback vehicle 102 may move the aircraft 110 to or from a de-icing area, and determine the total mass of the aircraft 110 at that time. As another example, the pushback vehicle 102 may move the aircraft 110 into or out of a maintenance hangar, and the total mass of the aircraft 110 may be determined at that time. Thus, the pushback vehicle 102 may move or pushback the aircraft 110 in many scenarios, and movement of the aircraft 110 by the pushback vehicle 102 is described as "pushback" to indicate that the pushback vehicle 102 pushes (rather than pulls) the aircraft 110.

Furthermore, in some examples, depending on when the total mass is determined, the total mass of the aircraft 110 can be determined for the aircraft 110 fully loaded and ready for take-off, or for the aircraft 110 empty to establish a dry weight or a weight change due to an aircraft configuration change (e.g., such as changing an interior or swapping out engines).

Figure 5:
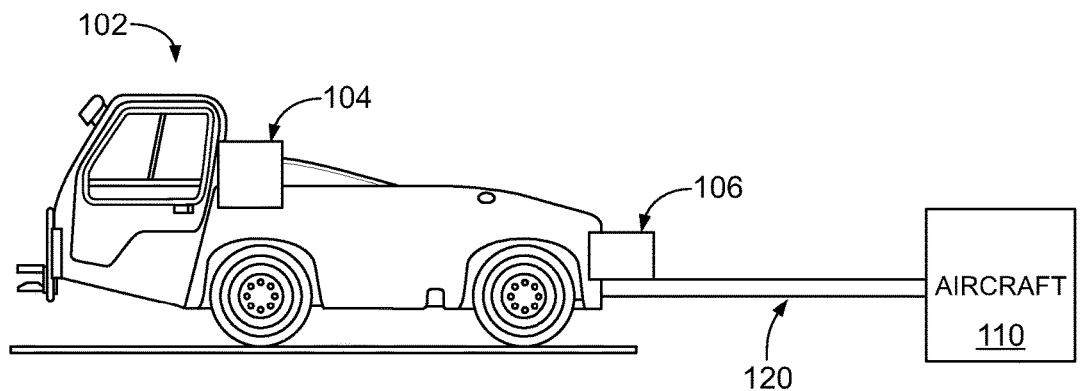
FIG. 5 illustrates an example placement location of the force sensor and the acceleration sensor, according to an example implementation.
Figure 6:
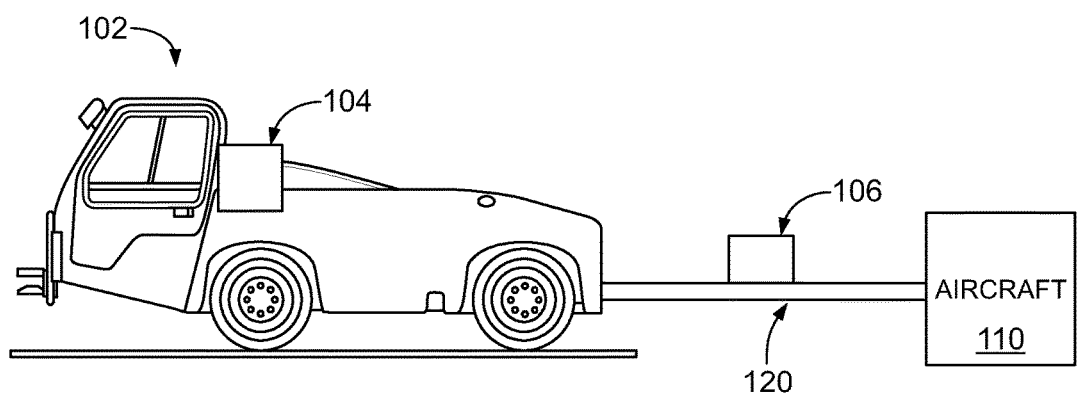
FIG. 6 illustrates an example placement of the force sensor on the rod, according to an example implementation.
Figure 7:
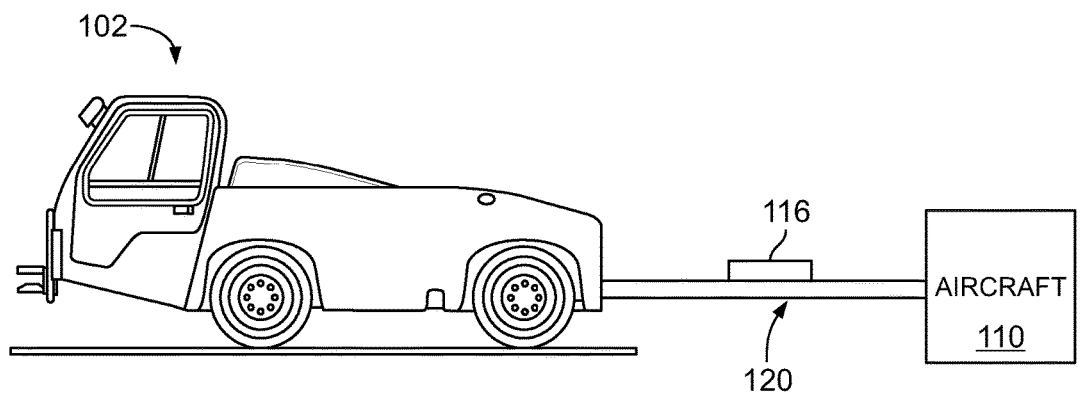
FIG. 7 illustrates an example placement of the device housing both the acceleration sensor and the force sensor positioned on the rod, according to an example implementation.

FIGS. 5-7 illustrate example placement locations of the force sensor 106 and the acceleration sensor 104, according to an example implementation. In FIG. 5, the acceleration sensor 104 is positioned on the pushback vehicle 102 to capture an acceleration in the pushback direction. This acceleration is used as the acceleration a in the equations above. The force sensor 106 is positioned proximal to a connection point of the rod 120 and the pushback vehicle 102. The rod 120 may be an aircraft coupler, and the force sensor 106 can be positioned on the pushback vehicle 102, on the rod 120, or on a connector between the pushback vehicle 102 and the rod 120, for example. The force sensor 106 can then measure or determine the force transferred through the rod 120 onto the aircraft 110. This force is used as the $F_{Pushback}$ value in the equation above.

FIG. 6 illustrates an example placement of the force sensor 106 on the rod 120, according to an example implementation. In some examples, the acceleration sensor 104 may alternatively or additionally be positioned on the rod 120.

FIG. 7 illustrates an example placement of the device 116 housing both the acceleration sensor 104 and the force sensor 106 positioned on the rod 120, according to an example implementation. In any of these examples, the acceleration sensor 104 and the force sensor 106 are easily accessible for maintenance or replacement.

Thus, within examples, the acceleration can be determined by placement of the acceleration sensor 104 anywhere on the pushback vehicle 102, or on the rod 120 that is connected to the pushback vehicle 102 and moves at the same speed as the pushback vehicle 102. The acceleration sensor 104 should be aligned into the direction of pushback.

As mentioned above, both the acceleration sensor 104 and the force sensor 106 are in communication with the computing device 108, which may be positioned on the pushback vehicle 102, and to which the acceleration sensor 104 and the force sensor 106 transmit logged data.

Figure 8:
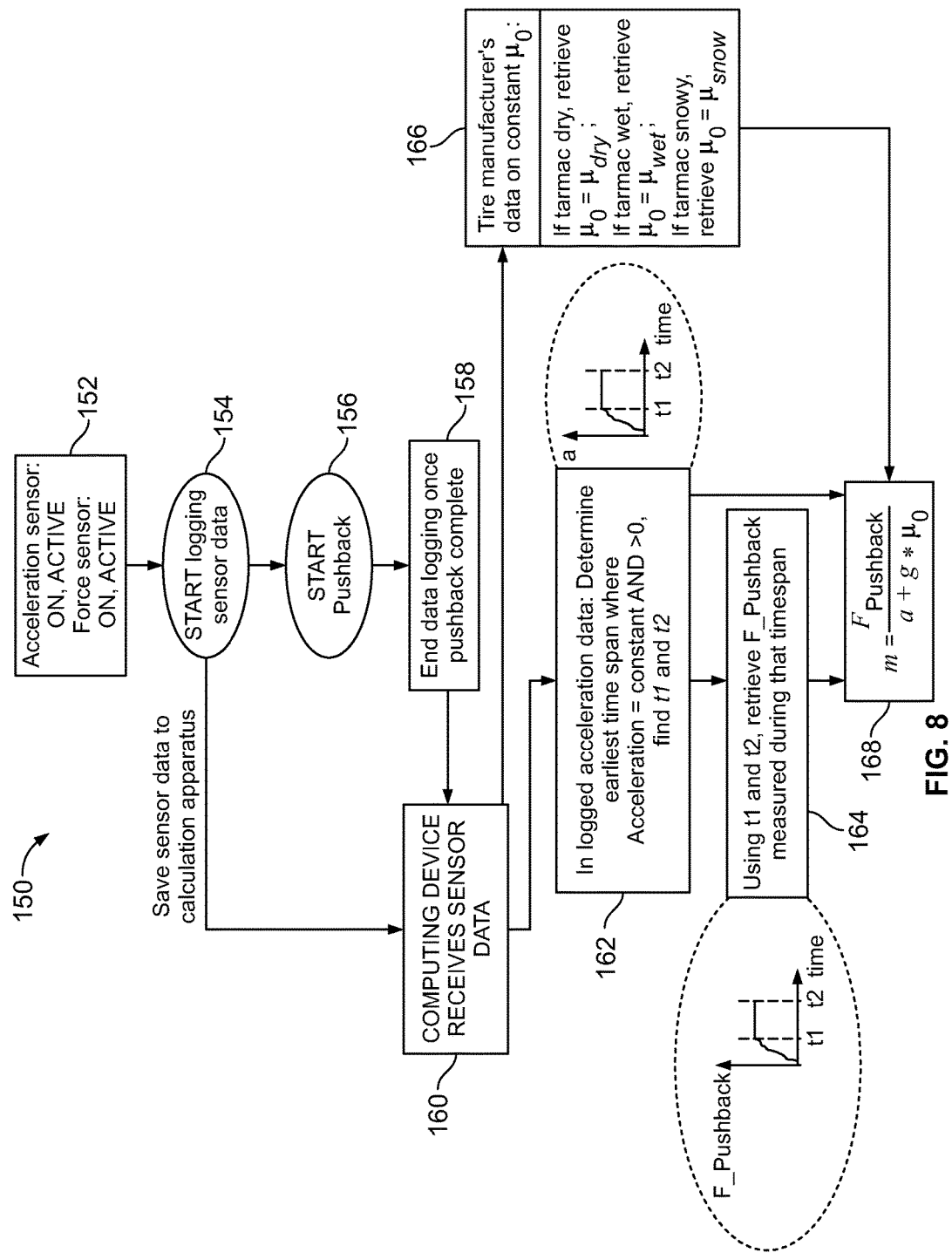
FIG. 8 shows a flowchart of an example method of determining the total mass of the aircraft at pushback, according to an example implementation.

FIG. 8 shows a flowchart of an example method 150 of determining the total mass of the aircraft 110 at pushback or during movement of the aircraft 110, according to an example implementation. Method 150 shown in FIG. 8 presents an example of a method that could be used with the system 100 or the computing device 108, shown in FIG. 1, for example. Further, devices or systems may be used or configured to perform logical functions presented in FIG. 8. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 150 may include one or more operations, functions, or actions as illustrated by one or more of blocks 152-168. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. In this regard, each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block in FIG. 8, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 152, once the aircraft 110 is cleared by apron control for pushback and the pilot gives the pushback vehicle 102 clearance to do so, the acceleration sensor 104 and the force sensor 106 are switched on. Following, at block 154, the method 150 starts logging measurement data. The pushback then commences by the pushback vehicle 102, as shown at block 156. Data logging stops once the pushback is complete, as shown at block 158.

The measurement data is provided to the computing device 108, as shown at block 160. The measurement data can be provided as being logged, and/or all at once when logging is completed in a batch process.

Then, in the computing device 108, a number of calculations are performed. First, in the acceleration data, a time window $t_1$ to $t_2$ is determined, in which the acceleration is constant or substantially constant, as shown at block 162. A constant acceleration is needed to also be able to receive or determine a constant pushback force. To determine the time window, a first timepoint is determine where acceleration was greater than zero and then a second timepoint is determined having a same acceleration to establish a constant acceleration over the time period. In some examples, at least a minimum time frame is required to be elapsed between the first timepoint and the second timepoint to enable pushback to have traversed some distance.

Following, as shown at block 164, using the determined time window between $t_1$ and $t_2$, the pushback force is retrieved from the data. For example, a force data point from the pushback force data is selected at a timepoint between the first timepoint and the second timepoint (e.g., between $t_1$ and $t_2$). When the acceleration is constant, the force is also constant.

Next, as shown at block 166, the coefficient of static friction is determined from tire manufacturer data, and may be dependent on weather conditions. For example, if the surface or tarmac is dry, $\mu_0 = \mu_{dry}$; if the surface or tarmac is wet, $\mu_0 = \mu_{wet}$; if the surface or tarmac is snowy, $\mu_0 = \mu_{snow}$. Any number of different coefficients of static friction may be used or set for different weather conditions.

All values obtained are then inserted into the equation above to solve for the mass m of the aircraft 110, as shown at block 168.

Figure 9:
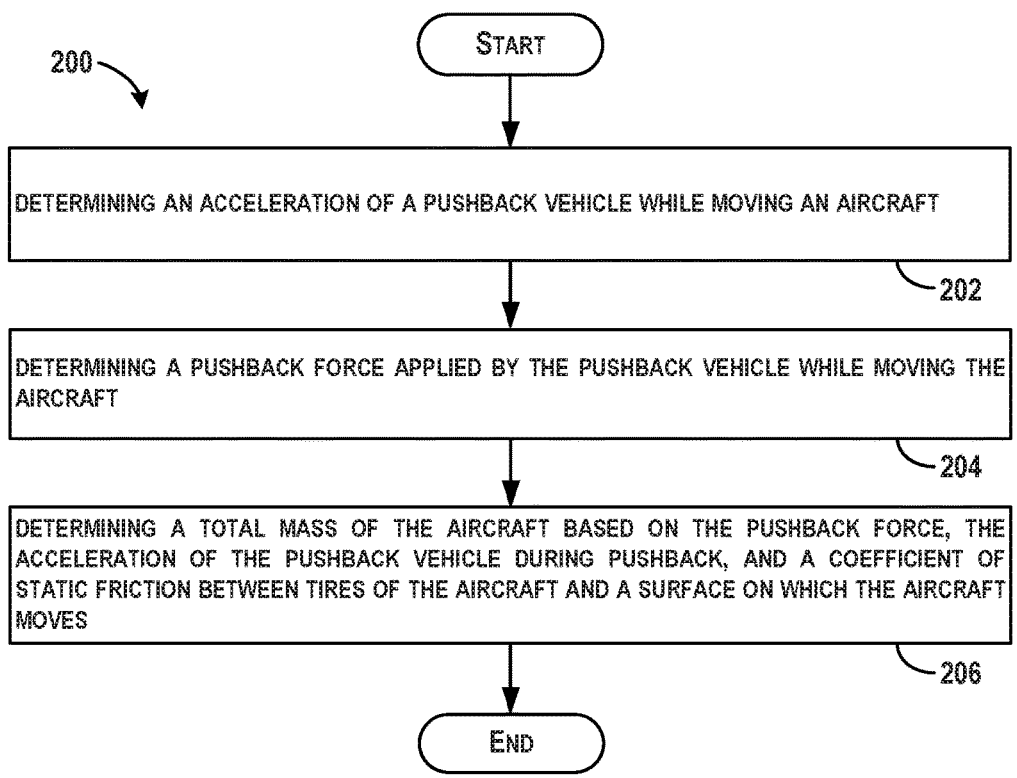
FIG. 9 shows a flowchart of another example method of determining the total mass of the aircraft at pushback, according to an example implementation.

FIG. 9 shows a flowchart of another example method 200 of determining the total mass of the aircraft 110 at pushback, according to an example implementation. Method 200 shown in FIG. 9 presents an example of a method that could be used with the system 100 or the computing device 108 shown in FIG. 1, for example. Further, devices or systems may be used or configured to perform logical functions presented in FIG. 9. Method 200 may include one or more operations, functions, or actions as illustrated by one or more of blocks 202-206. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 202, the method 200 includes determining an acceleration of the pushback vehicle 102 while moving the aircraft 110. At block 204, the method 200 includes determining a pushback force applied by the pushback vehicle 102 while moving the aircraft 110. At block 206, the method 200 includes determining a total mass of the aircraft 110 based on the pushback force, the acceleration of the pushback vehicle 102 during pushback, and a coefficient of static friction between tires 122 of the aircraft 110 and a surface on which the aircraft 110 moves. In these examples, determining the total mass of the aircraft 110 at pushback comprises calculating the total mass of the aircraft 110 fully loaded and ready for take-off.

Figure 10:
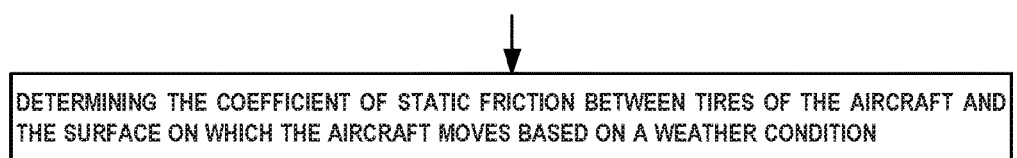
FIG. 10 shows a flowchart of an example method for use with the method shown in FIG. 9, according to an example implementation.

FIG. 10 shows a flowchart of an example method for use with the method 200, according to an example implementation. At block 208, functions include determining the coefficient of static friction between tires 122 of the aircraft 110 and the surface on which the aircraft 110 moves based on a weather condition.

Figure 11:
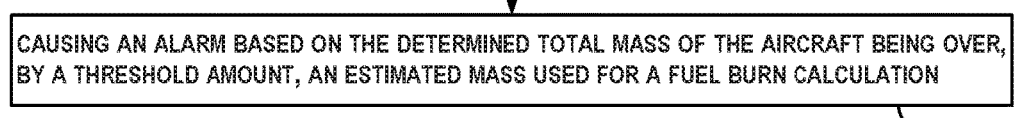
FIG. 11 shows a flowchart of another example method for use with the method shown in FIG. 9, according to an example implementation.

FIG. 11 shows a flowchart of another example method for use with the method 200, according to an example implementation. At block 210, functions include causing an alarm based on the determined total mass of the aircraft 110 being over, by a threshold amount, an estimated mass used for a fuel burn calculation. For instance, if the total mass of the aircraft is over 5% of the estimated mass (as determined using established weights per passenger and luggage) used for the fuel burn calculation, then an alarm can be provided to airline operators to modify a trajectory of the aircraft for better fuel burn.

Figure 12:
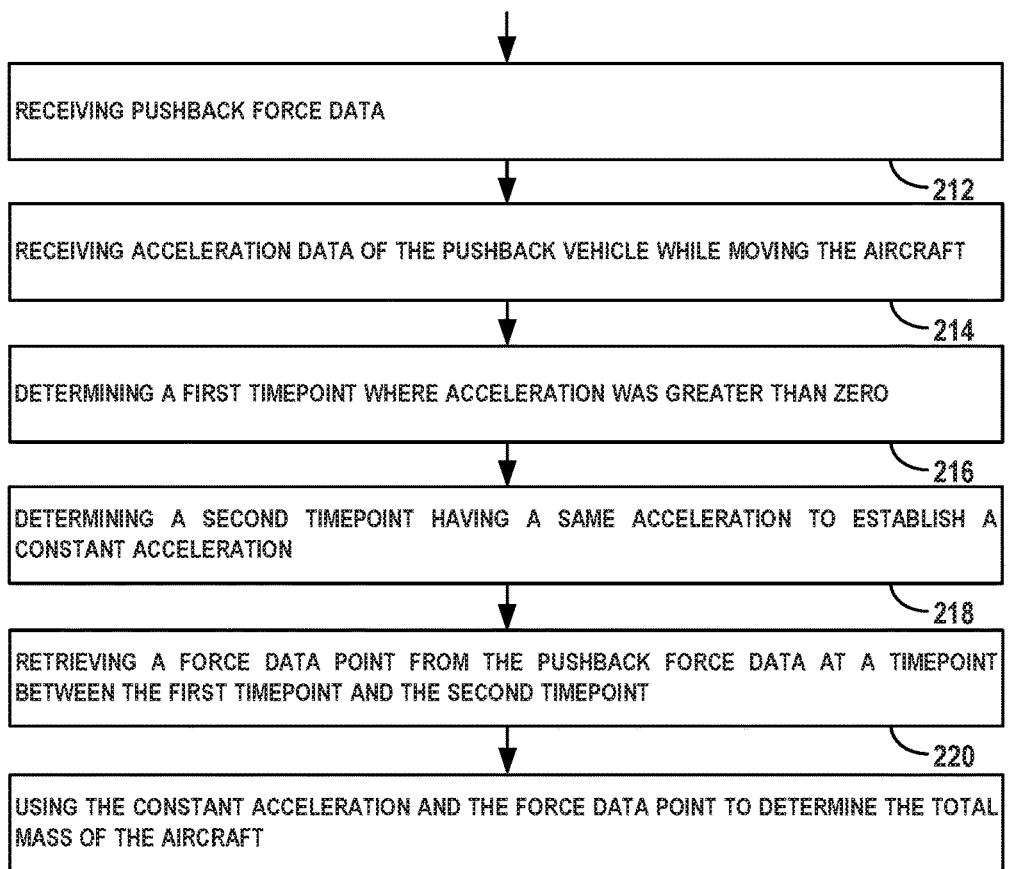
FIG. 12 shows a flowchart of another example method for use with the method shown in FIG. 9, according to an example implementation.

FIG. 12 shows a flowchart of another example method for use with the method 200, according to an example implementation. The method shown in FIG. 12 is useful for selecting acceleration and force data points within logged data. At block 212, functions include receiving pushback force data, and at block 214 functions include receiving acceleration data of the pushback vehicle 102 while moving the aircraft 110. At block 216, functions include determining a first timepoint where acceleration was greater than zero, and at block 218 functions include determining a second timepoint having a same acceleration to establish a constant acceleration. At block 220, functions include retrieving a force data point from the pushback force data at a timepoint between the first timepoint and the second timepoint, and at block 222, functions include using the constant acceleration and the force data point to determine the total mass of the aircraft 110.

Figure 13:
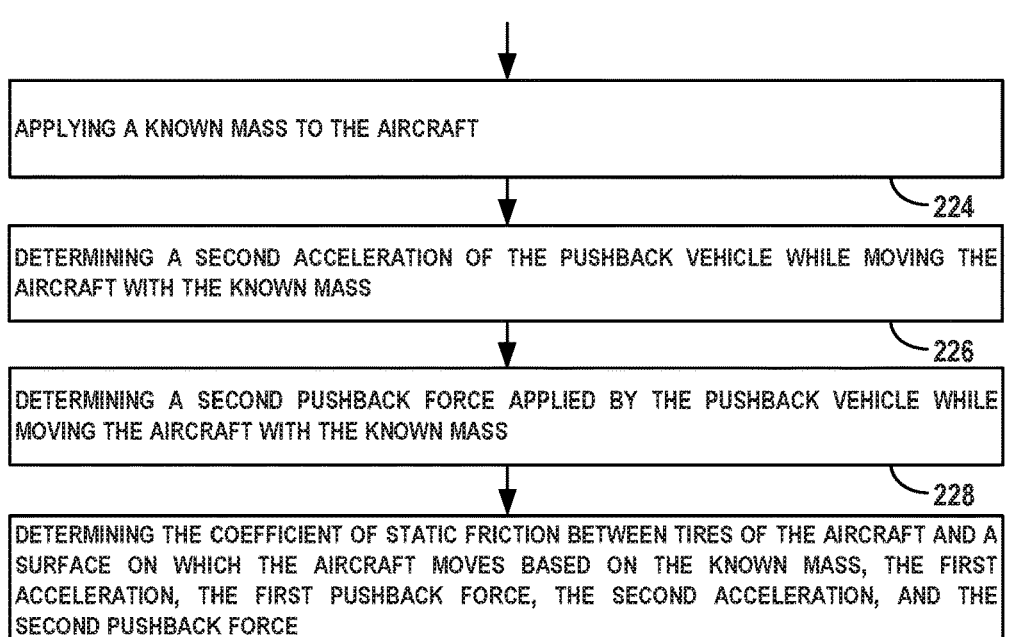
FIG. 13 shows a flowchart of an example method for use with the method shown in FIG. 9, according to an example implementation.

FIG. 13 shows a flowchart of an example method for use with the method 200, according to an example implementation. The method shown in FIG. 13 is useful for determining the coefficient of static friction. At block 224, functions include applying a known mass to the aircraft 110, and at blocks 226 and 228, functions include determining a second acceleration of the pushback vehicle 102 while moving the aircraft 110 with the known mass and determining a second pushback force applied by the pushback vehicle 102 while moving the aircraft 110 with the known mass. At block 230, functions include determining the coefficient of static friction between tires 122 of the aircraft 110 and a surface on which the aircraft 110 moves based on the known mass, the first acceleration, the first pushback force, the second acceleration, and the second pushback force. Within examples, determining the total mass of the aircraft 110 at pushback can be calculated using the following equation $$m = \frac{F_{Pushback}}{a + g \times \mu_0},$$

where m is the total mass of the aircraft 110, $F_{Pushback}$ is the pushback force, a is the acceleration of the pushback vehicle during pushback, g is acceleration due to gravity, and $\mu_0$ is the coefficient of static friction between the tires 122 of the aircraft 110 and the surface on which the aircraft 110 moves.

Figure 14:
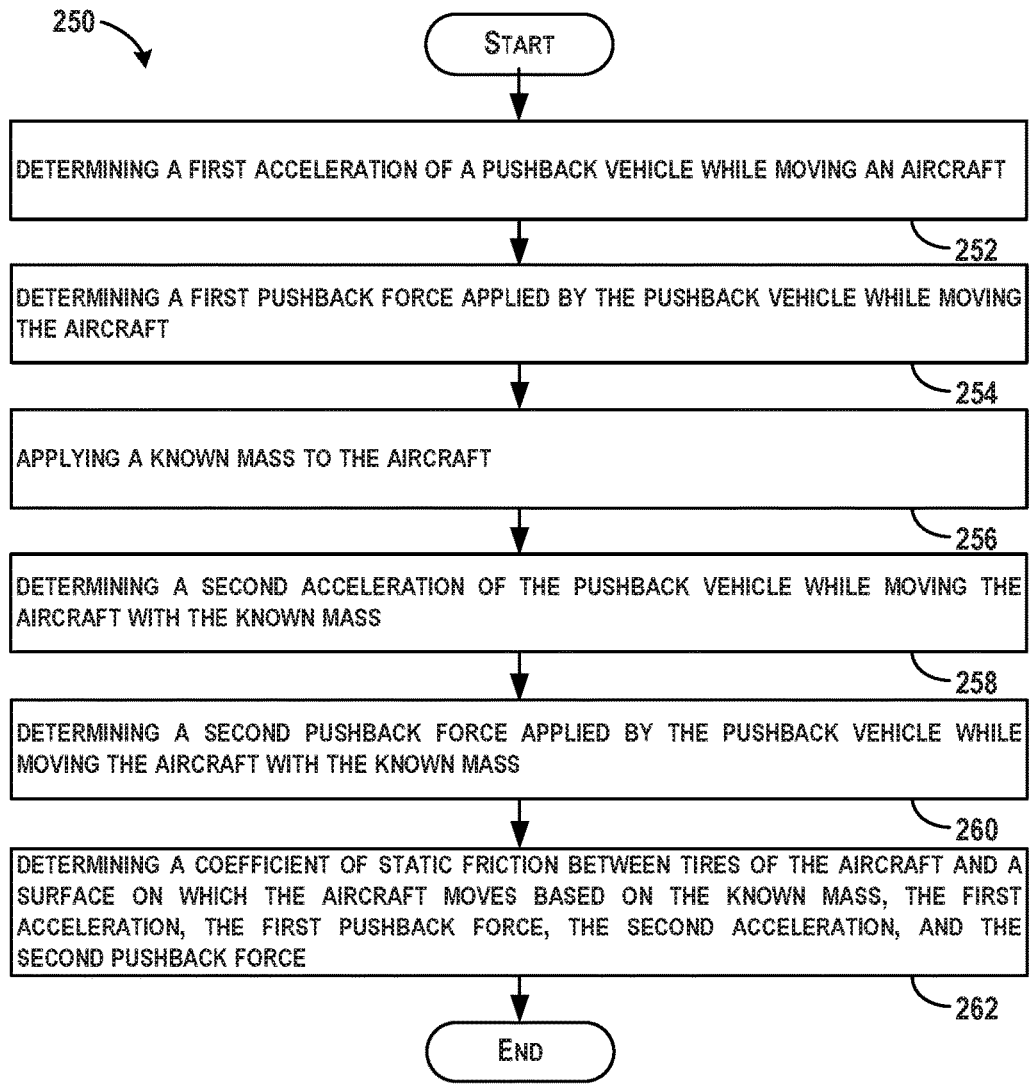
FIG. 14 shows a flowchart of an example method of determining the coefficient of static friction, according to an example implementation.

FIG. 14 shows a flowchart of an example method 250 of determining the coefficient of static friction, according to an example implementation. Method 250 shown in FIG. 14 presents an example of a method that could be used with the system 100 or the computing device 108 shown in FIG. 1, for example. Further, devices or systems may be used or configured to perform logical functions presented in FIG. 14. Method 250 may include one or more operations, functions, or actions as illustrated by one or more of blocks 252-262. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 252, the method 250 includes determining a first acceleration of the pushback vehicle 102 while moving the aircraft 110. At block 254, the method 250 includes determining a first pushback force applied by the pushback vehicle 102 while moving the aircraft 110. At block 256, the method 250 includes applying a known mass to the aircraft 110. At block 258, the method 250 includes determining a second acceleration of the pushback vehicle 102 while moving the aircraft 110 with the known mass. At block 260, the method 250 includes determining a second pushback force applied by the pushback vehicle 102 while moving the aircraft 110 with the known mass. At block 262, the method 250 includes determining a coefficient of static friction between tires 122 of the aircraft 110 and a surface on which the aircraft 110 moves based on the known mass, the first acceleration, the first pushback force, the second acceleration, and the second pushback force.

Within examples, the method 250 includes determining the coefficient of static friction using the following equation:

$$\Delta m = \frac{F_{Pushback_2}}{a_2 + g \times \mu_0} - \frac{F_{Pushback_1}}{a_1 + g \times \mu_0}$$

where $\Delta M$ is the known mass, $F_{Pushback_1}$ is the first pushback force, $F_{Pushback_2}$ is the second pushback force, $a_1$ is the first acceleration, $a_2$ is the second acceleration, g is acceleration due to gravity, and $\mu_0$ is the coefficient of static friction.

Figure 15:
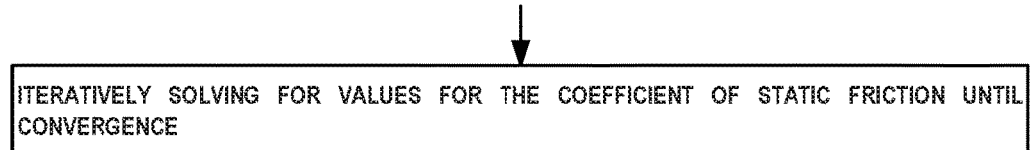
FIG. 15 shows a flowchart of an example method for use with the method, according to an example implementation.

FIG. 15 shows a flowchart of an example method for use with the method 250, according to an example implementation. At block 264, functions include iteratively solving for values for the coefficient of static friction, $\mu_0$, until convergence.

Using the method 250 to determine the coefficient of static friction would allow the determination of this constant without relying on data from a tire manufacturer. In an illustrative example of the method 250, initially an aircraft with any mass is pushed back while $F_{Pushback}$ and the acceleration is measured by the force sensor 106 and the acceleration sensor 104. Then, the same aircraft is loaded with a known mass (e.g. 100 kg) and the process is repeated. Once more, $F_{Pushback}$ and the acceleration are gauged. Therefore, at this point, the known variables are: $F_{Pushback_1}$, $F_{Pushback_2}$, acceleration$_1$ ($a_1$), acceleration$_2$ ($a_2$), and $\Delta m = m_2 - m_1$ (since the aircraft is heavier by 100 kg).

The equations below outline the process for determining $\Delta m$.

$$m_1 = \frac{F_{Pushback_1}}{a_1 + g \times \mu_0}$$

$$m_2 = \frac{F_{Pushback_2}}{a_2 + g \times \mu_0}$$

$$\Delta m = m_2 - m_1 = \frac{F_{Pushback_2}}{a_2 + g \times \mu_0} - \frac{F_{Pushback_1}}{a_1 + g \times \mu_0}$$

As shown in the equations above, only $\mu_0$ is an unknown. To still solve for $\mu_0$, a numeric solver can be used to solve the equation by iteratively inserting values for $\mu_0$ until a value is found that solves the equation. An example numeric solver includes Newton's method $$x_{n+1} = x_n - \frac{f(x_n)}{f'(x_n)}$$

To apply this method, the equation for $\Delta m$ is rearranged to solve for zero, as shown below.

$$0 = \frac{F_{Pushback_2}}{a_2 + g \times \mu_0} - \frac{F_{Pushback_1}}{a_1 + g \times \mu_0} - \Delta m$$

Then the first derivative for $\mu_0$ is determined as:

$$f'(\mu_0) = g\left(\frac{F_{Pushback\,1}}{a_1 + g \times \mu_0} - \frac{F_{Pushback\,2}}{a_2 + g \times \mu_0}\right)$$

Knowing that typical values for $\mu_0$ for rubber on tarmac are around 0.8, the numeric solver could start with an initial $\mu_0=0.4$ and iterate until convergence.

Example systems and methods described herein include a deterministic approach to calculating the total mass of the aircraft 110, instead of using estimates that are unable to be verified. Existing systems simply use a standard weight value for each passenger. However, there is no option to determine how good the estimates are compared to actual weights.

In some examples, the calculation of the total mass of the aircraft 110 can have a variance based on the coefficient of static friction that is used. Even though tire manufacturers will provide values for tires for different weather conditions, these values may include an error component in a range of about 0.05 (e.g., a coefficient of static friction for a tire on dry tarmac is estimated at 0.8, but due to weather circumstances and the surface of the tarmac, this may vary by an example of 0.05).

As example error calculation or error estimation is shown below using an expected error of $\Delta\mu_0=0.05$ as calculated by $$\left(f = m = \frac{F_{Pushback}}{a + g * \mu_0}\right).$$

An equation for error estimation is as follows $$\Delta m = \left|\frac{\partial f}{\partial \mu_0}\right| * \Delta\mu_0$$

The derivative of function (f) for $\mu_0$ is as follows $$\frac{\partial f}{\partial \mu_0} = -\frac{F_{Pushback} * g}{(a + g * \mu_0)^2}$$

For this calculation, parameters were used as follows: acceleration of $a=0.4$ m/s$^2$, mass of $m=251{,}290$ kg, gravitational acceleration $g=9.81$ m/s$^2$, $\mu_0=0.8$, and pushback force of $F_{Pushback}=100500$ N. Thus, a possible error may be in a range of $\Delta m=730$ kg, which is negligible given the mass of the aircraft 110.

Using standard aircraft mass determinations includes calculations based on a standard weight assumption per passenger around 82 kg/person, plus an extra 5 kg for carry-on luggage. It has been estimated that such parameters for standard calculations can be off by as much as 14 kg/pax. With a lowest seating capacity of 354 (3-class setting) and a highest of 442 (2-class setting), the error for standard mass determinations may be in a range of 4950 kg (354 passengers) to 6190 kg (442 passengers). Therefore, the error estimate of the example methods and systems described herein for a deterministic approach to calculating the total mass of the aircraft 110 yields smaller error ranges. These lower error ranges, when implemented in trajectory optimization solutions, can generate more cost-optimal trajectories and step climbs throughout cruise flight.

In further examples, additional benefits for accurate mass determinations can be achieved in regards to checked baggage weight. Currently, the weight of checked baggage cargo at the gate is not used as a weighing scale is not calibrated often enough to assure accuracy. Therefore, the weight values are not used for the calculation, but rather estimates are used (as with passengers). Of course, weight of each checked bag or luggage can vary. Example methods and systems described herein circumvents necessity of weighing checked baggage, as the entire aircraft's mass is determined directly, during a standard process (pushback) that is always performed. Moreover, the example systems are not stationary, and will not need to be implemented at every gate, but can be realized on every pushback vehicle 102.

Note that in some examples, while the deterministic methods are able to yield the entire aircraft's mass, the checked baggage estimate can nevertheless be used for refueling calculations. This will provide further safety checks. The example methods described herein can be used for non-safety trajectory optimization.

In further examples and enhancements, the aircraft 110 could be refueled with a known base amount of fuel and then the example deterministic methods described herein may be used to determine the total mass of the aircraft 110. Based on this mass, an ideal amount of fuel could then be calculated and further added.

Figure 16:
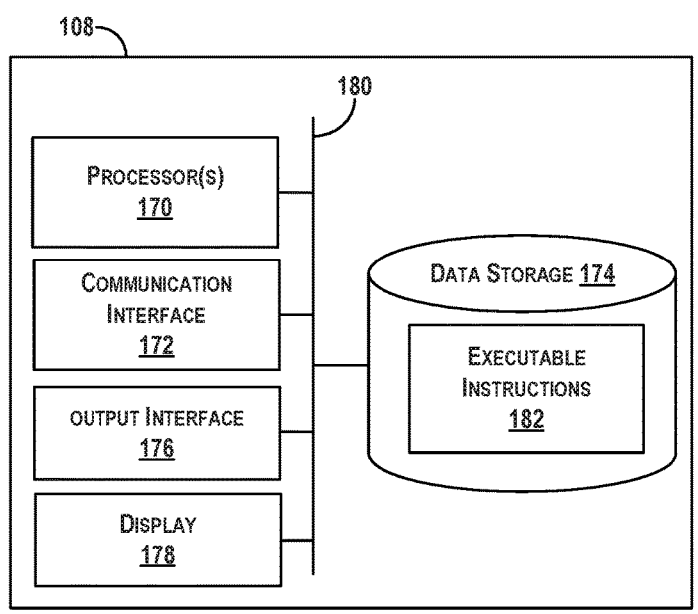
FIG. 16 is a block diagram illustrating an example of the computing device, according to an example implementation.

FIG. 16 is a block diagram illustrating an example of the computing device 108, according to an example implementation. The computing device 108 may be used to perform functions of methods shown in FIGS. 8-15. The computing device 108 has a processor(s) 170, and also a communication interface 172, data storage 174, an output interface 176, and a display 178 each connected to a communication bus 180. The computing device 108 may also include hardware to enable communication within the computing device 108 and between the computing device 108 and other devices (not shown). The hardware may include transmitters, receivers, and antennas, for example.

The communication interface 172 may be a wireless interface and/or one or more wireline interfaces that allow for both short-range communication and long-range communication to one or more networks or to one or more remote devices. Such wireless interfaces may provide for communication under one or more wireless communication protocols, such as Very High Frequency (VHF) Data link (VDL), VDL Mode 2, Aircraft Communications Addressing and Reporting System (ACARS) digital communications over VHF radio and satellite communications (SATCOM), Bluetooth, WiFi (e.g., an institute of electrical and electronic engineers (IEEE) 802.11 protocol), Long-Term Evolution (LTE), cellular communications, near-field communication (NFC), and/or other wireless communication protocols. Such wireline interfaces may include aircraft data buses such as Aeronautical Radio, Incorporated (ARINC) 429, 629, or 664 based interfaces, Ethernet interface, a Universal Serial Bus (USB) interface, or similar interface to communicate via a wire, a twisted pair of wires, a coaxial cable, an optical link, a fiber-optic link, or other physical connection to a wireline network. Thus, the communication interface 172 may be configured to receive input data from one or more devices, and may also be configured to send output data to other devices.

The communication interface 172 may also include a user-input device, such as a keyboard or mouse, for example.

The data storage 174 may include or take the form of one or more computer-readable storage media that can be read or accessed by the processor(s) 170. The computer-readable storage media can include volatile and/or non-volatile storage components, such as optical, magnetic, organic or other memory or disc storage, which can be integrated in whole or in part with the processor(s) 170. The data storage 174 is considered non-transitory computer readable media. In some examples, the data storage 174 can be implemented using a single physical device (e.g., one optical, magnetic, organic or other memory or disc storage unit), while in other examples, the data storage 174 can be implemented using two or more physical devices.

The data storage 174 thus is a non-transitory computer readable storage medium, and executable instructions 182 are stored thereon. The instructions 182 include computer executable code. When the instructions 182 are executed by the processor(s) 170, the processor(s) 170 are caused to perform functions. Such functions include determining a total mass of the aircraft 110 at pushback based on the pushback force, the acceleration of the pushback vehicle 102 during pushback, and a coefficient of static friction between tires 122 of the aircraft 110 and a surface on which the aircraft 110 moves.

The processor(s) 170 may be a general-purpose processor or a special purpose processor (e.g., digital signal processors, application specific integrated circuits, etc.). The processor(s) 170 may receive inputs from the communication interface 172, and process the inputs to generate outputs that are stored in the data storage 174 and output to the display 178. The processor(s) 170 can be configured to execute the executable instructions 182 (e.g., computer-readable program instructions) that are stored in the data storage 174 and are executable to provide the functionality of the computing device 108 described herein.

The output interface 176 outputs information to the display 178 or to other components as well. Thus, the output interface 176 may be similar to the communication interface 172 and can be a wireless interface (e.g., transmitter) or a wired interface as well. The output interface 176 may send information about the determined total mass of the aircraft to the airline operator 114 and/or to the onboard aircraft computer 112, for example.

By the term "substantially" or "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method comprising:
   moving an aircraft by a pushback vehicle coupled to the aircraft;
   determining an acceleration of the pushback vehicle while moving the aircraft;
   measuring, by a force sensor, a pushback force applied by the pushback vehicle while moving the aircraft; and
   determining a total mass of the aircraft based on the pushback force, the acceleration of the pushback vehicle, and a coefficient of static friction between tires of the aircraft and a surface on which the aircraft moves.

2. The method of claim 1, wherein determining the total mass of the aircraft comprises calculating the total mass of the aircraft fully loaded and ready for take-off.

3. The method of claim 1, further comprising:
   determining the coefficient of static friction between tires of the aircraft and the surface on which the aircraft moves based on a weather condition.

4. The method of claim 1, further comprising:
   causing an alarm based on the determined total mass of the aircraft being over, by a threshold amount, an estimated mass used for a fuel burn calculation.

5. The method of claim 1, further comprising:
   receiving pushback force data;
   receiving acceleration data of the pushback vehicle while moving the aircraft;
   determining a first timepoint where acceleration was greater than zero;
   determining a second timepoint having a same acceleration to establish a constant acceleration;
   retrieving a force data point from the pushback force data at a timepoint between the first timepoint and the second timepoint; and
   using the constant acceleration and the force data point to determine the total mass of the aircraft.

6. The method of claim 1, wherein determining the acceleration of the pushback vehicle while moving the aircraft comprises determining a first acceleration, and wherein determining the pushback force applied by the pushback vehicle while moving the aircraft comprises determining a first pushback force, and the method further comprises:
   applying a known mass to the aircraft;
   determining a second acceleration of the pushback vehicle while moving the aircraft with the known mass;
   determining a second pushback force applied by the pushback vehicle while moving the aircraft with the known mass; and
   determining the coefficient of static friction between tires of the aircraft and a surface on which the aircraft moves based on the known mass, the first acceleration, the first pushback force, the second acceleration, and the second pushback force.

7. The method of claim 1, wherein determining the total mass of the aircraft comprises determining the total mass of the aircraft using the following:

$$m = \frac{F_{Pushback}}{a + g \times \mu_0},$$

where m is the total mass of the aircraft, $F_{Pushback}$ is the pushback force, a is the acceleration of the pushback vehicle, g is acceleration due to gravity, and $\mu_0$ is the coefficient of static friction between the tires of the aircraft and the surface on which the aircraft moves.

8. A method comprising:
moving an aircraft by a pushback vehicle coupled to the aircraft;
determining a first acceleration of the pushback vehicle while moving the aircraft;
measuring, by a force sensor, a first pushback force applied by the pushback vehicle while moving the aircraft;
applying a known mass to the aircraft;
determining a second acceleration of the pushback vehicle while moving the aircraft with the known mass;
measuring, by the force sensor, a second pushback force applied by the pushback vehicle while moving the aircraft with the known mass; and
determining a coefficient of static friction between tires of the aircraft and a surface on which the aircraft moves based on the known mass, the first acceleration, the first pushback force, the second acceleration, and the second pushback force.

9. The method of claim 8, wherein determining the coefficient of static friction comprises using the following:

$$\Delta m = \frac{F_{Pushback_2}}{a_2 + g \times \mu_0} - \frac{F_{Pushback_1}}{a_1 + g \times \mu_0}$$

where $\Delta m$ is the known mass, $F_{Pushback_1}$ is the first pushback force, $F_{Pushback_2}$ is the second pushback force, $a_1$ is the first acceleration, $a_2$ is the second acceleration, g is acceleration due to gravity, and $\mu_0$ is the coefficient of static friction.

10. The method of claim 9, further comprising iteratively solving for values for $\mu_0$ until convergence.

11. A system comprising:
a pushback vehicle coupled to an aircraft and moving the aircraft, and coupled to an acceleration sensor to determine an acceleration of the pushback vehicle while moving the aircraft, and coupled to a force sensor to determine a pushback force applied by the pushback vehicle while moving the aircraft; and
a computing device having one or more processors to determine a total mass of the aircraft based on the pushback force, the acceleration of the pushback vehicle, and a coefficient of static friction between tires of the aircraft and a surface on which the aircraft moves.

12. The system of claim 11, wherein the pushback vehicle includes an airplane tug.

13. The system of claim 11, wherein the acceleration sensor is positioned on the pushback vehicle to capture an acceleration in a pushback direction.

14. The system of claim 11, wherein the force sensor includes a strain gauge.

15. The system of claim 11, further comprising:
a rod between the pushback vehicle and the aircraft, wherein the force sensor is positioned proximal to a connection point of the rod and the pushback vehicle.

16. The system of claim 11, further comprising:
a rod between the pushback vehicle and the aircraft, wherein the force sensor is positioned on the rod.

17. The system of claim 11, wherein the computing device is communicatively coupled to the acceleration sensor and the force sensor.

18. The system of claim 11, further comprising:
a device housing both the acceleration sensor and the force sensor.

19. The system of claim 18, wherein the device further comprises a wireless transmitter to transmit data including the acceleration of the pushback vehicle while moving the aircraft and the pushback force applied by the pushback vehicle while moving the aircraft to the computing device.

20. The system of claim 18, further comprising:
a rod between the pushback vehicle and the aircraft, wherein the device is positioned on the rod.

* * * * *